United States Patent [19]

Breitenbach

[11] 4,053,835

[45] Oct. 11, 1977

[54] APPARATUS FOR TRANSMITTING HIGH FREQUENCY SIGNALS

[75] Inventor: Otto Breitenbach, Nuremberg, Germany

[73] Assignee: Kabel-und Metallwerke Gutehoffnungshutte Aktiengesellschaft, Germany

[21] Appl. No.: 653,645

[22] Filed: Jan. 30, 1976

[30] Foreign Application Priority Data

Feb. 20, 1975 Germany ............................ 2507191

[51] Int. Cl.$^2$ ............................................... H04B 1/00

[52] U.S. Cl. .................................... 325/51; 333/84 L; 179/82

[58] Field of Search ...................... 179/82; 340/47, 48; 246/63 R, 63 C; 333/84 R, 84 L, 95 S; 325/51, 53, 54

[56] References Cited

U.S. PATENT DOCUMENTS

| | | | |
|---|---|---|---|
| 3,534,303 | 10/1970 | Hafner | 179/82 |
| 3,560,970 | 2/1971 | Kamimura | 333/84 L |
| 3,593,143 | 7/1971 | Nakahara | 333/84 L |
| 3,599,215 | 8/1971 | Yoshida | 333/84 L |
| 3,609,247 | 9/1971 | Halstead | 179/82 |

*Primary Examiner*—William C. Cooper
*Assistant Examiner*—Joseph A. Popek
*Attorney, Agent, or Firm*—Marn & Jangarathis

[57] ABSTRACT

In accordance with the teachings of the present invention apparatus for permitting interference free transmission of high frequency signals in any given frequency range is provided. In the inventive apparatus, a central conductor of a coaxially disposed pair of conductors is employed to radiate high frequency signal information and the coaxially disposed pair of conductors is mounted in a parallel manner to the path of a tracked vehicle on a support. The support includes a metallic member disposed along the entire length of the coaxially disposed pair of conductors which is periodically connected to the outer conductor of the coaxially disposed pair of conductors to substantially reduce field strength fluctuations through a suppression of induced secondary waves in the immediate proximity of said central conductor.

9 Claims, 3 Drawing Figures

APPARATUS FOR TRANSMITTING HIGH FREQUENCY SIGNALS

Figure 1:
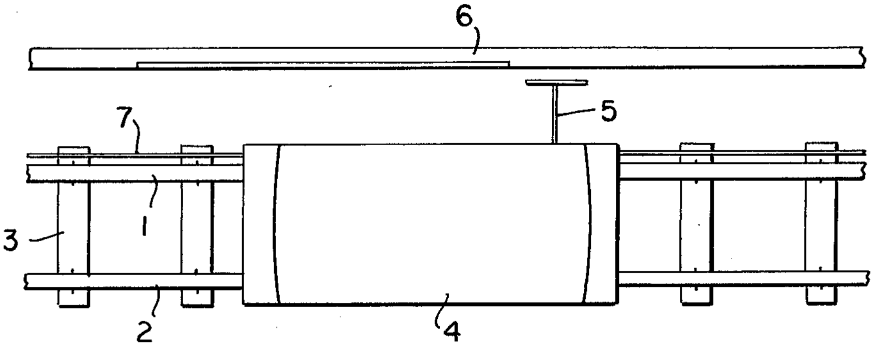

This invention relates to apparatus for transmitting high frequency signals between stationary equipment and a moving vehicle traveling upon a predetermined path and more particularly to transmitting apparatus of the foregoing kind which exhibits relatively uniform field strength characteristics and enhanced transmission qualities through the suppression of interfering reflections, standing waves and the like.

High frequency signal transmission apparatus employed with track bound vehicles and particularly that relied upon for television transmission thereto generally takes the form of a radiating central conductor disposed in a parallel relationship to the track which is scanned by antenna mounted on the track bound vehicle. The radiating central conductor generally takes the form of the inner conductor of a coaxially mounted pair having dielectric material interposed between the radiating central conductor and the outer conductor employed for the purposes of shielding and the like. A slot is cut in the outer conductor to accommodate the scanning antenna on the tracked vehicle and high frequency signals such as television signals are applied to the central conductor for transmission purposes. In high frequency signal transmission apparatus of this type, large fluctuations in the field strength of the signal being transmitted along the line represents a severe problem and in many cases, such fluctuations in field strength so adversely affect the transmission quality of the signal that adequate reception becomes unavailable.

Field strength fluctuations which occur in transmission apparatus of this kind are principally caused by interfering fields associated with reflections or standing waves formed on the tracks or the support elements therefor on which the tracked vehicle operates which in turn are picked up by the parallely disposed outer conductor of the coaxial cable through which transmission is occurring. Under these circumstances, as will be appreciated by those of ordinary skill in the art, the scanning antenna on the tracked vehicle will pick up a resulting signal comprising both the transmitted signal and induced reflections and standing waves so that the resulting signal received on the tracked vehicle will exhibit widely varying field strength characteristics.

One solution to this problem as disclosed in German Patent Application No. 2,404,363, which has now been laid open for inspection, involves an encapsulation of the outer conductor of the high frequency transmission cable, as well as the termination of the ends of the outer conductor with a characteristic impedence connected between the outer conductor and metallic material upon which interfering reflections and standing waves form. The characteristic impedence has a value equal to the line formed between the outer conductor and the metallic material so as to eliminate undesired interference. Using this technique, excellent results may be obtained; however, the resulting structure may only be employed for a very limited, defined frequency range whose maximum frequency is constrained by the limitation that the half wave length thereof must be smaller than the line length. Accordingly, this technique may only be employed for low frequency transmission and hence is not universal in application. Furthermore, it will be readily appreciated by those of ordinary skill in the art that structural assembly difficulties are common because the value of the wave resistor employed for terminating must be initially determined through experimentation.

An additional disadvantage associated with the above mentioned technique is that the same does not function if the interference is generated by conductors which are isolated with respect to grounds. These conditions frequently obtain because additional electrical lines which are disposed in a parallel relationship to the track and the radiating high frequency central conductor are usually employed for the purposes of supplying control signals for the tracked vehicle system or alternatively, the tracks themselves may be isolated from ground and employed to convey such electrical control information. Under these circumstances, field strength fluctuations in the radiated signals are created by interference associated with electromagnetic wave expansion within the radiating high frequency central conductor and the external line system which may be formed, for instance, between the outer conductor of the coaxial pair and for example, a parallely positioned electrical line. The secondary electrical wave in such an outer line system is induced by the radiating centrally disposed high frequency conductor.

Therefore, it is an object of the present invention to provide apparatus which permits interference free transmission of high frequency signals in any given frequency range, said apparatus being effective to accomplish interference free transmissions even in the presence of conductors which are isolated with respect to ground.

Figure 2:
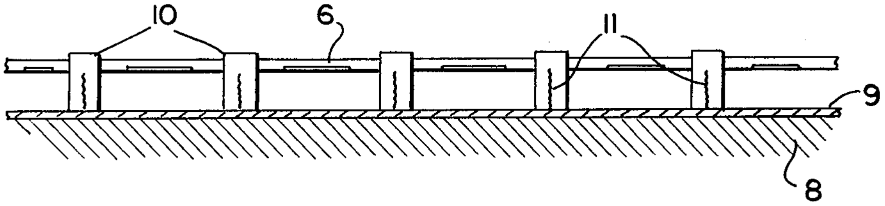
Figure 3:
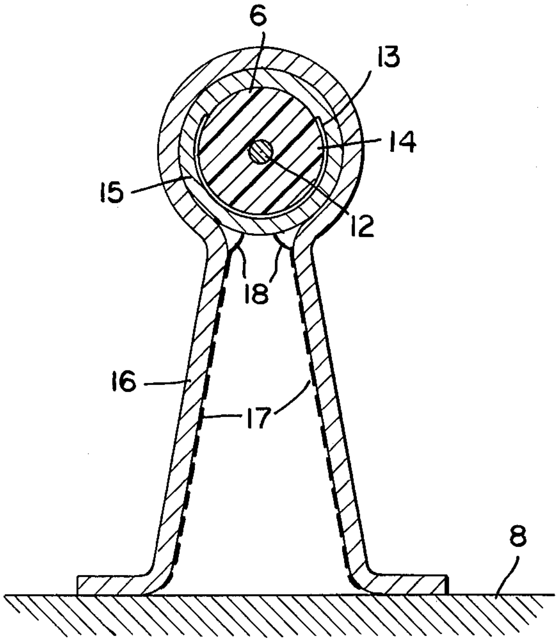

In accordance with the teachings of the present invention, apparatus which permits interference free transmission of high frequency signals in any given frequency range is provided wherein a central conductor of a coaxially disposed pair of conductors is employed to radiate high frequency signal information and said coaxial disposed pair of conductors is mounted in a parallel manner to the path of a tracked vehicle on support means, said support means including metallic means disposed along the entire length of said coaxial disposed pair of conductors and periodically connected to the outer conductor of said coaxial disposed pair of conductors to substantially reduce field strength fluctuations through a suppression of induced secondary waves in the immediate proximity of said central conductor. The invention will be more clearly understood by reference to the following detailed description of exemplary embodiments thereof in conjunction with the accompanying drawings in which:

FIG. 1 is a schematic plane view of a track installation employing apparatus for transmitting high frequency signals in accordance with the instant invention;

FIG. 2 is a front view of the apparatus for transmitting high frequency signals according to the instant invention which shows details of the support and mounting means therefor; and FIG. 3 is a detailed view in cross section of mounted apparatus for transmitting high frequency signals illustrating the coaxial pair of the conductors disposed within a housing and mounted in accordance with the teachings of the instant invention.

Referring now to FIG. 1, there is generally shown a track installation for track bound vehicles which is provided with apparatus for transmitting high frequency signals in accordance with the teachings of the instant invention. More particularly, as shown in FIG. 1, the track installation comprises a pair of tracks 1 and 2 which are mounted on ties 3 in the manner of a well known railroad mounting. On this track installation, a vehicle 4 is mounted which has an antenna 5 arranged to receive high frequency signal information from parallely disposed transmission equipment which includes a coaxial cable 6, which is formed and mounted, as shall be seen hereinafter, in accordance with the teachings of the instant invention. Additionally, the track installation is provided with an electrical line 7 which is also parallely disposed to the tracks and the coaxial conductor pair 6 and here may be assumed to provide control information or power to the tracked vehicle to control the operation thereof. Since both the electrical line 7 and the coaxial pair 6 are disposed in a parallel relationship interference as a result of the electromagnetic radiation from line 7 will be induced in the outer cable of the conductive pair if the same is not properly isolated in the manner taught by the instant invention. Furthermore, standing waves and reflections associated with the tracks 2 and 7 will also be induced in the outer conductor of the conductive pair 6 which results in extreme field strength fluctuations when the central conductor of the conductive pair is utilized to radiate high frequency signal information such as used to convey video signals to the tracked vehicle 4 through antenna 5.

To provide appropriate isolation for the outer conductor of the conductor pair 6 employed to convey high frequency signal information, additional material is provided for mounting the conductive pair 6 along the total length of the line and the outer conductor of the conductor pair is electrically connected thereto. Due to this additional metallic material, the effective dielectric space between the outer conductor of the conductive pair 6 and the support therefor is decreased. In this manner, secondary waves which are induced in the immediate vicinity of the central conductor of the coaxial pair are substantially suppressed so that interference free operation of the high frequency radiating central conductor is achieved without a creation of field strength fluctuations. The manner in which the exemplary embodiment of the instant invention is implemented is best shown in FIG. 2.

Referring now to FIG. 2, it will be seen that the support 8 for the conductive pair 6 is provided with a metallic strip 9 which, in the exemplary embodiment, underlies the conductive pair 6 along the entire length thereof and thus provide a conductive surface along the entire length of the coaxial disposed pair of conductors 6. The conductive pair of cables 6 is mounted on support 8 by means of supporting elements 10 and for the purpose of eliminating field strength fluctuations due to induced secondary waves, standing waves and reflections, the outer conductor of the conductor pair 6 may be electrically connected to the metal strip 9 through the supporting elements 10. This electrical connection is generally indicated in FIG. 2 by the wavy lines 11 within the support elements 10. In order to assure the elimination of interference for the total frequency range, it is desirable that the placement of the conductive connections between the metal strip and the outer conductor of the conductive pair 6 have a distance which is less than the half wave length of the highest frequency to be transmitted within the central conductor of the conductive pair 6. However, since the distance between the supporting elements 10 with respect to one another will generally correspond to this value, the requisite periodicity in mounting can generally be provided simply by providing a connection between the outer one of the conductors in cable 6 to the metallic strip 9 through the support elements 10. While the manner in which the invention is implemented has been generally illustrated in FIG. 2, actual construction details may be best appreciated upon a consideration of FIG. 3 which shows a coaxial pair of conductors mounted in accordance with an embodiment of the instant invention wherein such cross section has been taken through one of the support elements 10 shown in FIG. 2.

Referring now to FIG. 3, it will be seen that the coaxial pair of conductors forming the high frequency line or cable 6 comprises an inner conductor 12, an outer conductor 13, separated from one another in the well known manner by a coaxially disposed intervening layer of dielectric material 14. The inner conductor 12 is adapted to receive high frequency signal information such as video information to be supplied to the tracked vehicle 4 and to radiate such information so that the same may be picked up by the antenna 5. Although not shown in detail in FIG. 3, the outer conductor 13 of the coaxial pair is provided with a longitudinal slot so that the antenna 5 of the vehicle may be accepted therein as the vehicle moves down the track. The high frequency cable comprising the coaxially disposed conductors 6 is encompassed by a jacket 15 in the conventional manner, and in the case of the embodiment illustrated in FIG. 3, this assembly may be provided with a cover plate 16 extending along the whole length of the coaxial pair. The cover plate 16 thus functions to replace the periodic support elements 10 shown in FIG. 2 while additionally providing environmental protection and additional rigidity for the mounted coaxial cable 6. In the case of the embodiment shown in FIG. 3, the inner surface of the cover plate 16 may be provided with a metallic layer 17 in lieu of the metallic strip 9 and it will be appreciated that the metallic layer 17 extends along the entire length of the coaxial pair as well as the cover plate 16. The metallic layer 17 is periodically connected to the outer conductor 13 of the coaxial pair 6 through conductors or the like indicated by the conductors 18 and it will be appreciated by those of ordinary skill in the art that the periodicity of the connection of the outer conductor 13 to the metallic layer 17 will correspond to that described in association with connections 11 in FIG. 2. These connections, it will be recalled, are only necessary at certain intervals, which intervals must exhibit a displacement which is less than the half wave length of the highest frequency to be transmitted. The use of a metallic layer such as illustrated as layer 17 within the surface of the continuous cover plate 16 rather than using the metallic strip of the type illustrated by strip 9 in FIG. 2 achieves a form of enlargement of the outer conductor 13 of the coaxial pair which also acts to suppress the creation of secondary waves in the manner described above. However, regardless of which form of metallic strip is employed, very substantial suppression of secondary waves, reflections and standing waves associated with a parallel conductor such as 7 or the tracks 1 and 2 is achieved in the vicinity of the central conductor 12 so that high frequency signal information may be radiated therefrom without substantial fluctuations in field strength. This is thought to occur because the metallic material to which the outer conductor is connected acts to decrease the effective dielectric interval between the outer conductor 13 of the coaxial pair or high frequency cable and the support therefor so that any secondary waves which may be induced are substantially suppressed in the vicinity of the coaxial pair of cables 6. Therefore, interference free operation of the high frequency cable is possible without a creation of substantial field strength variations and this result is obtained to a highly advantageous degree when the distances of the points of connection between the outer conductor 13 and the metallic strip or layer 17 or 9 occurs with a periodicity such that the distance between points of connection is less than the half wave length of the highest frequency to be transmitted.

As will be appreciated by those of ordinary skill in the art, the nature of the support employed for transmitting apparatus for high frequency signal information of the type described herein may vary widely and frequently employ metallic material disposed over substantially the entire length of the coaxial pair of conductors. Under these conditions, separate metallic layers or strips need not be provided as that available in the support structure may be utilized so long as the periodic connection of the outer conductor 14 to such metallic material is implemented with the requisite periodicity as described above.

Although the present invention has been disclosed in conjunction with rather simplified exemplary embodiments, it will be appreciated by those of ordinary skill in the art that the apparatus for transmitting high frequency signals disclosed herein will admit of a multitude of variations and adaptations. Therefore, it is manifestly intended that this invention be only limited by the claims and the equivalents thereof.

What is claimed is:

1. Apparatus for transmitting high frequency signals to a vehicle adapted to travel along a predetermined path comprising:

a reflecting high frequency cable disposed parallel to said path, said reflecting high frequency coaxial cable including a central conductor for radiation high frequency information, coaxial outer conductor means enabling said high frequency information to be conveyed and a coaxially disposed layer of dielectric material intermediate said central and outer conductors;

support means for mounting said coaxial cable in parallel with said predetermined path, said support means including metallic material disposed along the length of said coaxial cable; and means for electrically connecting said coaxial outer conductor to said metallic material at predetermined intervals along the length of said coaxial cable.

2. The apparatus for transmitting high frequency signals according to claim 1 wherein said predetermined intervals represent displacement distances which are less than the half wave length of the highest frequency to be transmitted through said central conductor.

3. The apparatus for transmitting high frequency signals according to claim 1 wherein said support means is isolated with respect to ground and said metallic material comprises a metallic strip disposed on said support means.

4. The apparatus for transmitting high frequency signals according to claim 3 additionally comprising a plurality of support element means periodically mounted on said support means for fixedly mounting said coaxial cable thereto, said means for connecting being extended through selected ones of said plurality of support element means.

5. The apparatus for transmitting high frequency signals according to claim 4 wherein said predetermined intervals represent displacement distances which are less than the half wave length of the highest frequency to be transmitted through said central conductor.

6. The apparatus for transmitting high frequency signals according to claim 1 wherein said support means comprises cover plate means enclosing said coaxial cable and providing a support therefor, said metallic material being disposed as a layer on interior surface portions of said cover plate means.

7. The apparatus for transmitting high frequency signals according to claim 6 wherein said means for connecting comprises wire means connected between said coaxial outer conductor and said metallic material layer at said predetermined intervals.

8. The apparatus for transmitting high frequency signals according to claim 7 wherein said cover plate means extends the full length of said coaxial cable.

9. The apparatus for transmitting high frequency signals according to claim 8 wherein said predetermined intervals represent displacement distances which are less than the half wave length of the highest frequency to be transmitted through said central conductor.

* * * * *

UNITED STATES PATENT OFFICE

CERTIFICATE OF CORRECTION

Patent No. 4,053,835 Dated October 11, 1977

Inventor(s) Otto Breitenbach

It is certified that error appears in the above-identified patent and that said Letters Patent are hereby corrected as shown below:

Claim 1, line 37, "radiation" should be -- radiating --.

Signed and Sealed this

*Fourteenth* Day of *February 1978*

[SEAL]

*Attest:*

RUTH C. MASON
*Attesting Officer*

LUTRELLE F. PARKER
*Acting Commissioner of Patents and Trademarks*